United States Patent
Jonqueres

[11] Patent Number: 5,918,472
[45] Date of Patent: Jul. 6, 1999

[54] AIR CYCLE ENVIRONMENTAL CONTROL SYSTEM WITH VAPOR CYCLE SYSTEM ASSISTED CONDENSATION

[75] Inventor: Michel Jonqueres, Torrance, Calif.

[73] Assignee: AlliedSignal Inc., Morristown, N.J.

[21] Appl. No.: 09/114,262

[22] Filed: Jul. 11, 1998

Related U.S. Application Data

[60] Provisional application No. 60/052,905, Jul. 11, 1997.

[51] Int. Cl.⁶ ................................. F25D 9/00; F25B 9/00
[52] U.S. Cl. ................................. 62/87; 62/172; 62/402
[58] Field of Search ................................. 62/87, 172, 402

[56] References Cited

U.S. PATENT DOCUMENTS

| | | |
|---|---|---|
| Re. 32,100 | 4/1986 | Rannenberg . |
| 3,097,504 | 7/1963 | Quick et al. . |
| 4,198,830 | 4/1980 | Campbell ............................. 62/172 X |
| 4,263,786 | 4/1981 | Eng . |
| 4,430,867 | 2/1984 | Warner ...................................... 62/402 |
| 4,434,624 | 3/1984 | Cronin et al. ............................. 62/172 |
| 4,553,407 | 11/1985 | Rannenberg ............................. 62/402 |
| 4,963,174 | 10/1990 | Payne ..................................... 62/402 X |
| 4,966,005 | 10/1990 | Cowell et al. ........................ 62/172 X |
| 4,967,565 | 11/1990 | Thomson . |
| 5,086,622 | 2/1992 | Warner . |

FOREIGN PATENT DOCUMENTS 914124 12/1962 United Kingdom .
976564 11/1964 United Kingdom .

*Primary Examiner*—Christopher B. Kilner
*Attorney, Agent, or Firm*—Robert Desmond, Esq.

[57] ABSTRACT

A method for conditioning water vapor bearing compressed air for supply as conditioned air to an enclosure includes the steps of flowing the compressed air into a condenser-evaporator heat exchanger and then cooling the compressed air with a liquid evaporating refrigerant in the condenser-evaporator. Thus, the water vapor in the compressed air can become condensed liquid water available for subsequent separation to form a dehumidified air. The dehumidified air undergoes reheating with a vapor condensing refrigerant in a reheater-condenser such that the dehumidified air becomes a reheated air. The reheated air is then routed through a turbine to provide the supply to the enclosure. An apparatus is also provided for accomplishing the above steps and includes a condenser-evaporator heat exchanger capable of placing the compressed air in heat exchange relationship with a vapor cycle subsystem. A water extractor is in flow communication with the condenser-evaporator, with the extractor being for extracting the condensed water to produce a dehumidified air. A reheater-condenser is in flow communication with the water extractor. The reheater-condenser is capable of placing the dehumidified air in heat exchange relationship with the vapor cycle subsystem to produce an evaporated air. A turbine is in flow communication with the reheater-condenser such that the turbine is capable of producing a cooled, expanded air to the enclosure.

51 Claims, 5 Drawing Sheets

AIR CYCLE ENVIRONMENTAL CONTROL SYSTEM WITH VAPOR CYCLE SYSTEM ASSISTED CONDENSATION

CROSS-REFERENCE TO RELATED APPLICATIONS

The present application claims the benefit of U.S. Provisional Application No. 60/052,905 filed Jul. 11, 1997.

BACKGROUND OF THE INVENTION

The present invention relates to Environmental Control Systems (ECSs) and, more specifically, to an improved ECS and an improved method of conditioning water vapor compressed air while assisting water condensation with a vapor cycle system (VCS).

ECSs are used to provide a supply of conditioned air to an enclosure, such as an aircraft cabin and cockpit. Typical air cycle ECSs operate on a flow of high energy bleed air taken from an intermediate or high pressure stage within a jet engine having multi-compression stages. The bleed air is typically pre-cooled within a primary heat exchanger with heat being dumped to ambient air, and then flowed to a turbine. The air expands in the turbine, providing cooling as well as mechanical energy to drive a fan drawing ambient air. A compressor may be provided in addition to the simple cycle above to create a "bootstrap" cycle, whereby the compressor is used to increase the air pressure prior to expansion in the turbine. In that case, a secondary heat exchanger removes the heat of compression before the air is admitted to the turbine. The power for the compressor is also provided by the turbine. Air from the turbine is discharged to the cabin to provide cooling. Additionally, but essential to the design of ECSs, specific equipment and cycle configuration are employed to condense and remove most of the incoming moisture so that relatively dry air is supplied to the cabin and internal freezing of the system components is avoided.

Current state of the art ECSs have been referred to as 3 wheel and 4 wheel high pressure water separation systems. A reheater heat exchanger is typically used to pre-cool the humidified air with subsequent condensation primarily occurring in a condenser heat exchanger, with this process occurring prior to expansion in the turbine and, therefore, being at "high" pressure. Thereafter, the condensed water is extracted to produce dehumidified air. Those systems use the dehumidified air, after it has been cooled during expansion through a turbine, as the heat sink or coolant medium in a heat exchange process to cause the condensation of the humidified air in the condenser.

In current ECSs, condensing water from vapor to liquid form requires a considerable amount of energy removal from the air/water mixture, and that energy is transferred in the form of added heat to the coolant air stream in the condenser. In the 3 wheel system, the added heat is directly passed onto the ECS delivery stream, resulting in a warmer supply to the cabin. To offset the result of a warmer supply, a larger input of pressure energy to further cool the air in the turbine and/or larger heat exchangers may be required. In the 4 wheel system, a second turbine wheel is added and "recovers" part (up to 20%) of the added heat energy, thus obtaining a more efficient cooling process.

Vapor cycle ECSs (VCSs) have also been used for cooling enclosures, in particular when large heat loads are present with no need for or availability of large pressurized airflow that could be used to power an air cycle. Compared to an air cycle, a VCS has a higher coefficient of performance—that is, the ratio of cooling capacity achieved to the energy input required to power the system. VCSs operate on the principle of compressing a working fluid in the vapor state and cooling it by heat transfer with a suitable heat sink medium (such as ambient air) so the fluid changes phase and becomes liquid. Expanding the working fluid absorbs a considerable amount of latent heat and thereby cools the desired enclosure indirectly by heat transfer during the evaporating process in an evaporator. In the evaporator, the working fluid is interfaced with air or a transport fluid that later circulates through the cabin.

While the above prior ECSs have utilized two air streams for heat exchange, some have sought to integrate a VCS with an air cycle system. Such hybrid systems have the potential to combine some of the advantages of air and vapor cycles for the purpose of more efficient cooling, water condensation and extraction. But in those prior hybrid cycles, vapor cycle systems have not usually been used to condense water vapor for subsequent dehumidification. Rather, the VCS has been commonly used to further cool air stream branches coming off the main air stream, with the branches acting as dedicated cooling mechanisms for electronics or other localized loads. As an example, the VCS disclosed in U.S. Pat. No. 4,966,005 is not used as an aid to condense water. Instead, the VCS is used to cool the air stream after it has been expanded and then heated in a condenser. U.S. Pat. No. 4,963,174 does disclose a VCS to cause condensation in the air stream prior to expansion in a turbine. But a disadvantage to such system is that the VCS condenser rejects heat exclusively to ambient air and, therefore, the system receives no benefit from recovery of the heat of condensation.

Despite the advantages in prior ECS designs using an air cycle, vapor cycle or hybrid cycle, the designs still have limitations, including those relating to energy loss in the water removal process. As water is condensed, considerable energy is expanded, and there is a need to recover the largest portion of that energy in the form of cooling, rather than wasting it by rejection to ambient air or increasing the supply temperature. Water condensation energy provided by a cooling turbine in an air cycle system is added (in whole or in most part) in the form of heat to the air supplied to the cabin. Conversely, water condensation energy provided by a VCS which rejects it to RAM air does not benefit the thermodynamic cycle and represents an unrecovered loss. Also, ECSs based on an air cycle have an inherently lower efficiency, or coefficient of performance, than VCS cycles. An increase in the coefficient of performance or efficiency resulting from the addition of a VCS means the ECS could provide more cooling capacity for a given ECS unit size. Alternatively, greater efficiency can mean a smaller sized ECS unit for a given load.

As can be seen, there is a need for an improved ECS and an improved method for high pressure water extraction using the combination of an air cycle and vapor cycle which will increase efficiency. Also, there is a need for an ECS that can utilize a VCS for assistance in water condensation while providing for recovery of the heat of condensation in the form of energy that would enhance the cooling capacity of the system.

SUMMARY OF THE INVENTION

The present invention is directed to an improved ECS with water condensation being assisted by a vapor cycle system. The invention is also directed to an improved method of conditioning water vapor bearing compressed air while minimizing energy losses during water removal. Such method comprises the following air cycle and vapor cycle steps.

The air cycle steps include pre-cooling a compressed bleed air in an ambient air heat exchanger, with the ambient air being either drawn from a fan or pushed by dynamic pressure in a moving vehicle; condensing a majority of the moisture in an incoming air stream in a condenser by heat transfer with a liquid refrigerant fluid in a phase of evaporation, with the fluid being part of the closed loop vapor cycle subsystem; removing liquid water by mechanical means after the step of condensation; reheating a dehumidified air in a reheater by heat transfer with the refrigerant fluid in vapor phase; and expanding a reheated air in a turbine, thus providing cooled air and mechanical power to drive the fan and a VCS compressor.

The vapor cycle steps include compressing a refrigerant vapor in one or several compressor stages; cooling and condensing a superheated vapor in one or several condensing heat exchangers receiving parallel flows of the vapor and in heat transfer relationship with, respectively, the air cycle and other cooling agent(s) (in particular RAM air in a preferred embodiment); expanding a condensed liquid in an expansion valve; evaporating an expanded liquid in an evaporating heat exchanger by heat transfer with air from the air cycle; and returning the evaporated vapor to the compressor in a closed cycle loop.

The various embodiments of the present invention, and any combination of features thereof, constitute parts of the present invention. In general, the present invention enables the VCS to condensate the water in the air cycle without incurring an energy penalty in the air cycle. The ability to reheat the air to increase its energy prior to expansion in the air turbine and to adjust a vapor cycle fluid flow ratio between the two VCS condensers optimizes the amount of condensing heat energy transferred between the VCS and ACS, thus benefiting the overall cycle and size of the combined system.

These and other features, aspects, and advantages of the present invention will become better understood with reference to the following drawings, description, and claims.

BRIEF DESCRIPTION OF THE DRAWINGS

FIG. 1a is a schematic diagram of a first embodiment of an environmental control system according to the present invention;

FIG. 1b is a schematic diagram of coupling between air cycle and vapor cycle subsystems in the first embodiment shown in FIG. 1a;

FIG. 2b is a schematic diagram of coupling between air cycle and vapor cycle subsystems in the second embodiment shown in FIG. 2a;

DETAILED DESCRIPTION OF THE INVENTION

Figures 1A, 1B:
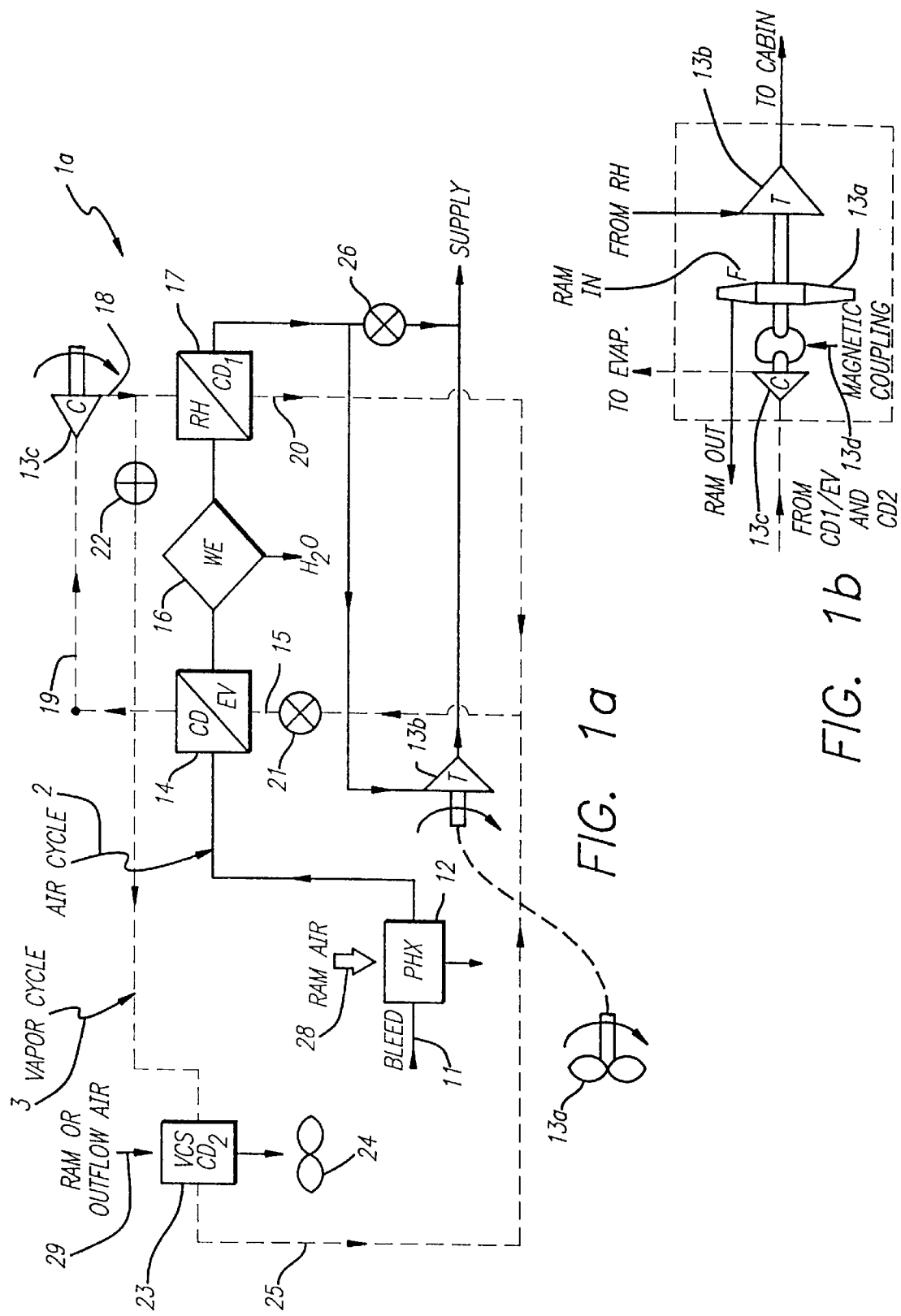

FIG. 1a schematically depicts a first embodiment of an environmental control system 1a according to the present invention. The system 1a comprises an air cycle subsystem 2 and a vapor cycle subsystem 3. The air cycle 2 includes at least one fan 13a, one turbine 13b, one primary heat exchanger 12, one condenser-evaporator heat exchanger 14, one reheater-condenser heat exchanger 17, and one water extractor 16. The vapor cycle subsystem 3 includes at least one compressor 13c stage mechanically engaged to the air cycle turbine 13b, one evaporating heat exchanger 14 shared with the air cycle 2, one condensing heat exchanger 17 shared with the air cycle 2, one additional condensing heat exchanger 23 using a separate cooling source from the air cycle 2 RAM air 29, and one expansion valve 21.

The system 1a generally operates by receiving a bleed air stream 11 to be conditioned for eventual supply to an enclosure, such as the cabin of an aircraft. The conditioning of the bleed air 11 includes the steps or acts of removing water vapor and lowering the temperature. The operation of the present invention, as described hereinafter, corresponds to sea level or low altitude conditions when substantial water vapor is present in the ambient air and has to be removed by the system 1a.

In the context of an aircraft, the bleed air 11 comes from a turbine engine. The air cycle subsystem 2 first pre-cools the bleed air 11 in a primary heat exchanger 12 where it is cooled by heat exchange with ambient or RAM air 28 drawn by the fan 13a which is powered by the turbine 13b. A pre-cooled air from the primary heat exchanger 12 is then further cooled in the condenser-evaporator heat exchanger 14 by heat transfer with an expanded refrigerant fluid 15 in the vapor cycle subsystem 3. In the condenser-evaporator 14, the refrigerant 15 absorbs heat from the pre-cooled air and evaporates at constant temperature. At the same time, the pre-cooled air is cooled to the point where substantial condensation of the water vapor contained in the pre-cooled air occurs.

From the condenser-evaporator 14, an air with condensed water is then ducted to a water extractor 16 where the condensed water is removed by mechanical means, leaving a substantially dehumidified air stream. The dehumidified air stream is then ducted to the reheater-condenser heat exchanger 17. Therein, the dehumidified air is reheated by heat transfer with a compressed, hot refrigerant vapor 18 in the vapor cycle subsystem 3. The heat transfer involves the refrigerant vapor 18 giving out heat to the dehumidified air and evaporating essentially all remaining free moisture not removed in the water extractor 16. Consequently, the dehumidified air becomes a superheated or reheated air stream. Conversely, the refrigerant vapor 18 is condensed at a fixed temperature to a liquid state.

The reheated air is then directed to the inlet of the air cycle turbine 13b where it is expanded to near cabin pressure and then flowed to the enclosure. In the process of expansion, the dehumidified and reheated air is cooled to the desired supply temperature. A turbine bypass valve 26 may be partially modulated to control the supply temperature when full cooling is not required.

In more particularly describing the vapor cycle subsystem 3 of this first embodiment, it can be seen in FIG. 1a that the subsystem 3 works with the air cycle subsystem 2 in two heat transfer relationships. The heat transfer relationships occur via the condenser-evaporator 14 and the reheater-condenser 17. In the condenser-evaporator (14), expanded liquid refrigerant (15) evaporates at constant temperature to a vapor state. From the condenser-evaporator 14, an expanded vapor refrigerant 19 flows to the vapor cycle compressor 13c, which is powered by direct shaft drive by the air cycle turbine 13b. The compressor 13c raises the pressure and temperature of the refrigerant 19 to produce the compressed refrigerant vapor 18.

A portion of the compressed vapor 18 then flows to the reheater-condenser 17 while another portion of the vapor 18 flows in parallel to an auxiliary VCS condenser 23, as described below. The portion of the refrigerant vapor 18 that flows to the reheater-condenser 17 is cooled at constant temperature by heat transfer with the dehumidified air. The compressed vapor 18 thus condenses to a refrigerant liquid 20. The refrigerant liquid 20 is then routed to an expansion valve 21 where it is throttled to reduce its pressure. The expansion valve 21 produces an expanded refrigerant liquid 15. The expanded liquid 15 then enters the condenser-evaporator 14 to complete the closed loop vapor cycle 2.

The portion of the compressed vapor 18 that flows in parallel to the VCS condenser 23 is cooled therein by heat transfer with a colder fluid, which is either a RAM air or cabin outflow air 29 drawn by a fan 24. In the VCS condenser 23, the refrigerant vapor 18 condenses and is returned as a high pressure liquid 25 to mix with the refrigerant liquid 20. Both liquid streams 20, 25 then flow to the expansion valve 21 to become the expanded liquid 15 mentioned above.

As can be appreciated, with the expanded liquid 15 flowing into the condenser-evaporator 14, the heat of condensation of the incoming water is removed from the air cycle 2 by the vapor cycle 3 and rejected in part to the cooling fluid flowing to the VCS condenser 23. Only a portion of the heat of condensation, which is adjustable by modulation of a VCS condenser valve 22, is returned to the air cycle 2 in the reheater-condenser 17. The amount of returned heat can be adjusted to provide sufficient reheating of the dehumidified air stream to prevent entrained liquid moisture from entering the turbine 13b and freeze when system supply temperatures are below 32° F. (0° C.). This energy is recovered by the turbine 13b in the form of mechanical energy. No heat is added to the air cycle 2 after the turbine 13b, thus allowing for maximum cooling capacity of the system 1. That is an advantage over conventional 3 wheel air cycle design.

The first embodiment shown in FIG. 1a contemplates the use of a combined air turbine-driven vapor cycle machine. Such combination, as depicted in FIG. 1b, includes a magnetic coupling assembly 13d that assures mechanical drive between the turbine 13b and vapor cycle compressor 13c, while allowing complete independence of the two fluid circuits or subsystems 2, 3. Nevertheless, other alternate means of mechanically driving the VCS compressor 13c can be considered within the scope of the present invention.

Figure 2A:
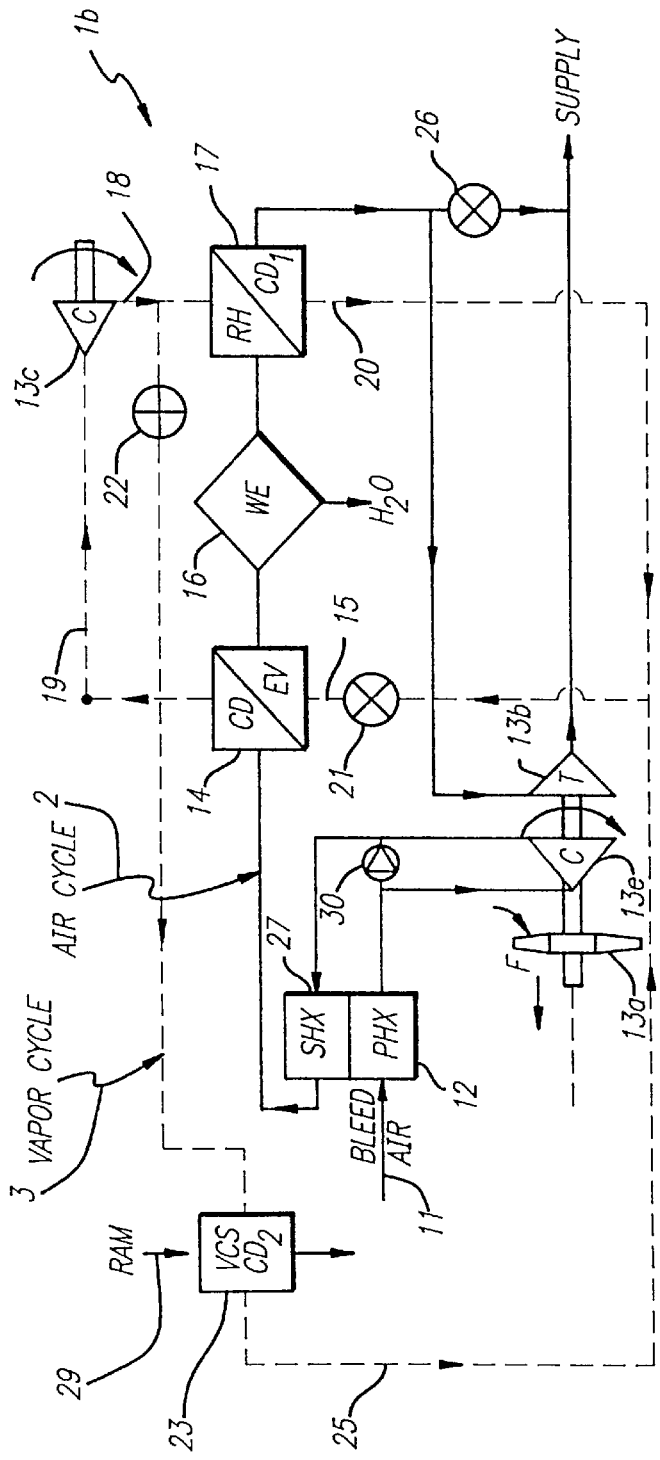
FIG. 2a is a schematic diagram of a second embodiment of an environmental control system according to the present invention.

FIG. 2a schematically depicts an ECS 1b that is a second embodiment of the present invention. The second embodiment is essentially the same as the first embodiment, with the most significant differences being the addition of a secondary heat exchanger 27 and an air cycle compressor 13e in the second embodiment. Accordingly, the bleed air 11 flows into the primary heat exchanger 12 for pre-cooling. A pre-cooled air then moves into a check valve 30 such that the air can either flow to the air cycle compressor 13e or directly to the secondary heat exchanger 27.

If the air flows into the compressor 13e, the air is compressed and heated. From the compresssor 13e, which is propelled by the same shaft that drives the turbine 13b, a compressed air flows to the secondary heat exchanger 27. In the secondary heat exchanger 27, the additional heat of compression is removed by heat transfer with the RAM air (not shown). The heated RAM air can then flow to the primary heat exchanger 12 where it is placed in heat exchange with the bleed air 11. One advantage of the "bootstrap" compressor 13e is to provide additional turbine 13b power when available bleed pressure is low.

For the second embodiment, the air flow from the secondary heat exchanger 27 can then flow through the remainder of the air cycle 2, as in the first embodiment. The vapor cycle 3 of the second embodiment is also constructed and operates similarly to the first embodiment. Among other things, the vapor cycle 3 of the second embodiment operates in heat exchange relationship with the air cycle 2 at the condenser-evaporator 14 and the reheater-condenser 17.

Figure 2B:
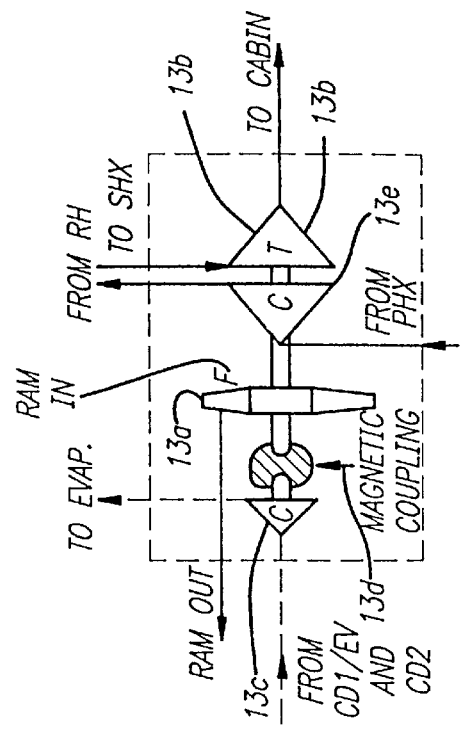

The second embodiment shown in FIG. 2a contemplates the use of a combined air turbine-driven vapor cycle machine, as in the first embodiment. Such combination, as depicted in FIG. 2b, includes a magnetic coupling assembly 13d for mechanical drive between the turbine 13b and the air cycle compressor 13e with vapor cycle compressor 13c. As with the first embodiment, the coupling in the second embodiment allows complete independence of the two subsystems 2, 3.

Figure 3:
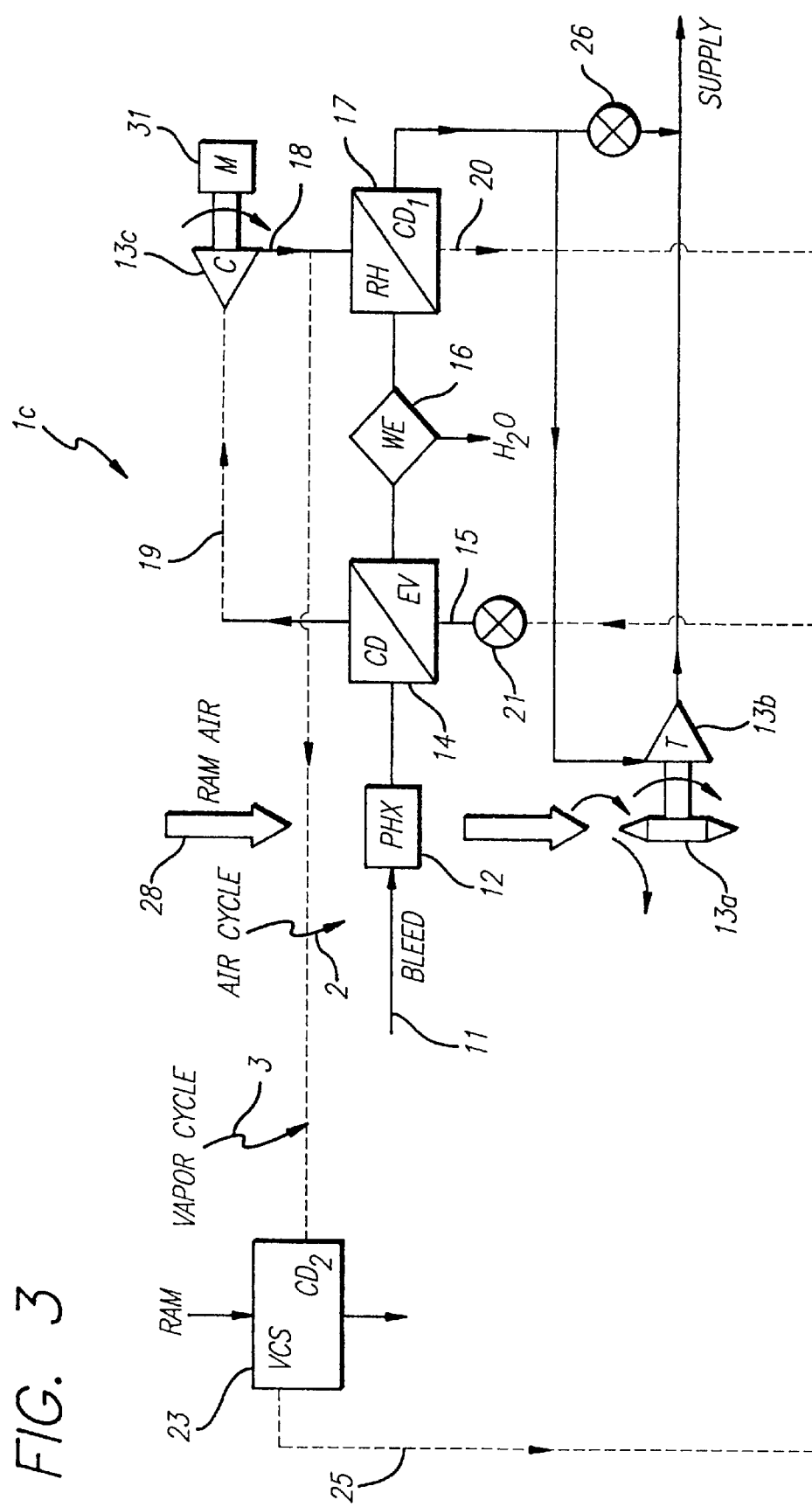
FIG. 3 is a schematic diagram of a third embodiment of an environmental control system according to the present invention.

FIG. 3 schematically depicts an ECS 1c that is a third embodiment of the present invention. The third embodiment is essentially the same as the first embodiment, with the most significant difference being the drive separation between the VCS compressor 13c and the air cycle turbine 13b. In the third embodiment, the VCS compressor 13c is driven, for example, by an electric motor 31. One advantage of separate drives is the ability to seal the VCS 3 and maintain it with no impact on the integrity (mechanical or contamination) of the air cycle 2. Also, redundancy of each air or vapor cycle relative to each other is provided. There is the ability of retaining cooling capacity from the air cycle turbine 13b if the VCS 3 is shut down, as well as retaining cooling capacity from the VCS 3 if the turbine 13b is shut down.

Figure 4:
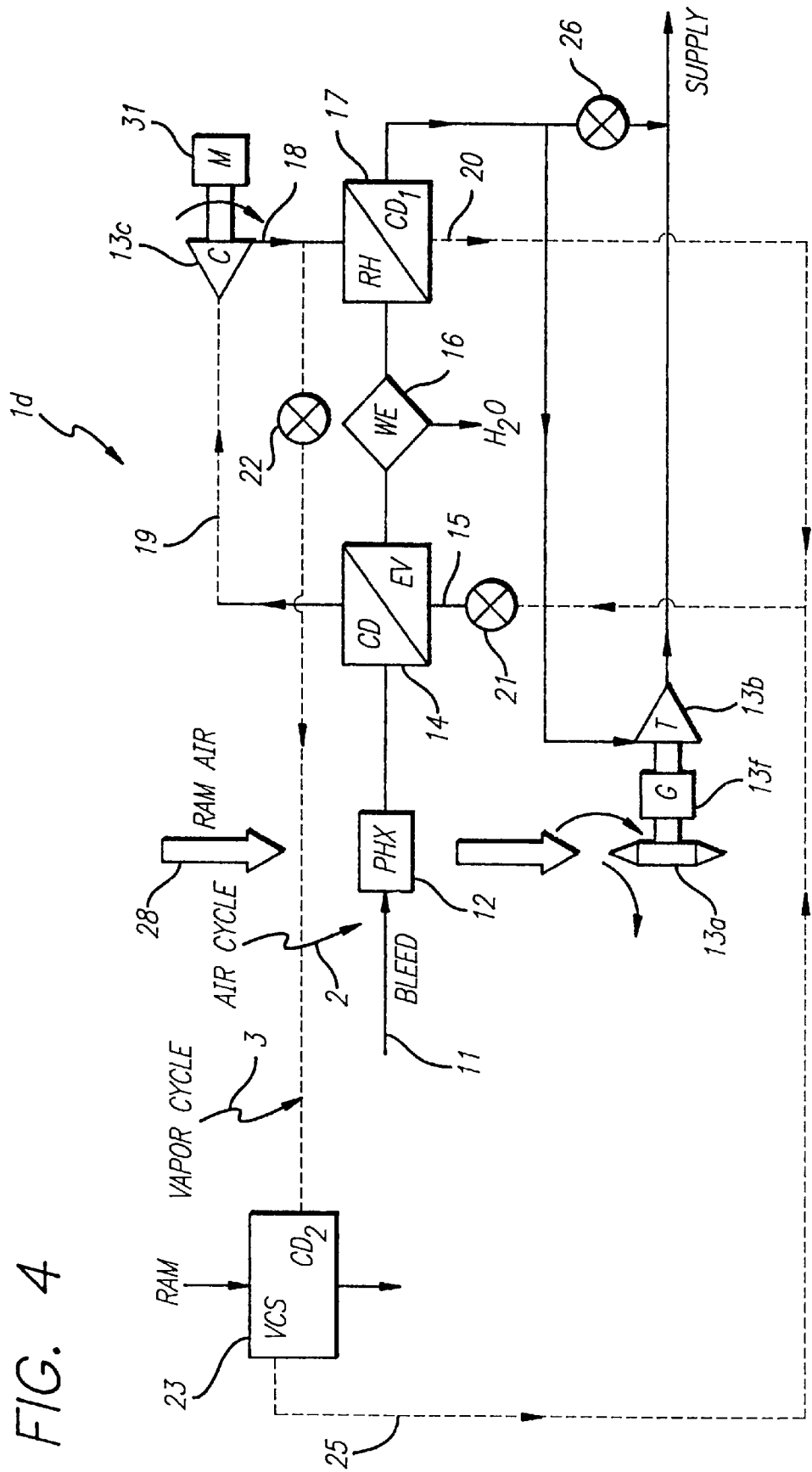
FIG. 4 is a schematic diagram of a fourth embodiment of an environmental control system according to the present invention.

FIG. 4 schematically depicts an ECS 1d that is a fourth embodiment of the present invention. The fourth embodiment is essentially the same as the third embodiment, with the difference being the addition of a generator 13f between the fan 13a and the turbine 13b. The generator 13f provides power to drive the separately motor driven VCS compressor 13c. One advantage of this system 1d is the non-reliance on aircraft electrical power supply, except in failure modes. A back-up power supply from the airplane would enable independent VCS 3 cooling when the air cycle turbine 13b is shut down.

Figure 5:
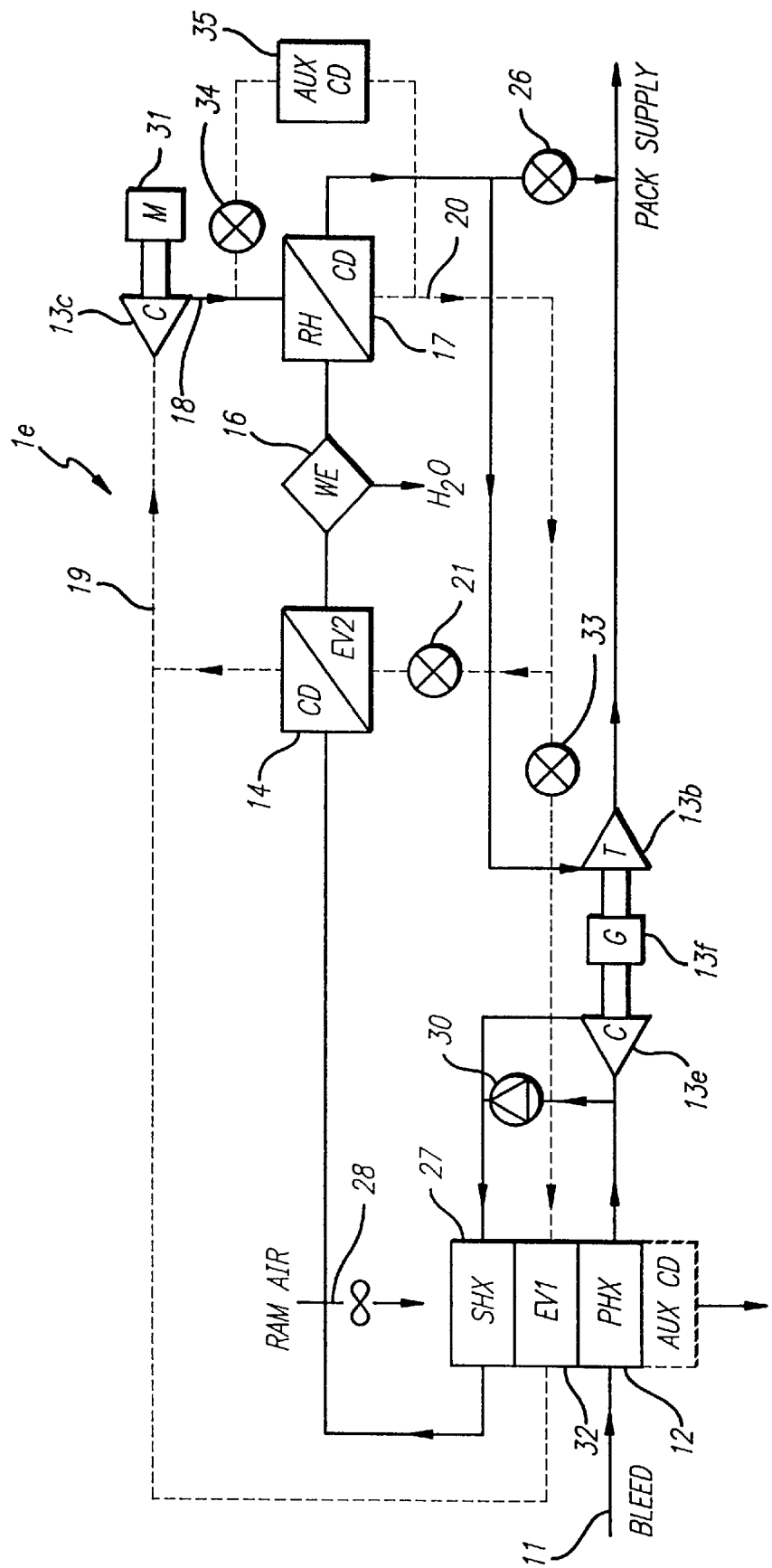
FIG. 5 is a schematic diagram of a fifth embodiment of an environmental control system according to the present invention.

FIG. 5 schematically depicts an ECS 1e that is a fifth embodiment of the present invention. In this embodiment, the VCS auxiliary condenser is operating at relatively higher temperature downstream of the air cycle primary heat exchanger 12 in the main RAM circuit. This system 1e also relies on a second evaporator 32 between the secondary and primary heat exchanger RAM flows that serves to lower the temperature to the air compressor 13e inlet. Additionally, the system 1e reduces the power required by the air cycle compressor 13e.

For the fifth embodiment, a bleed air 11 is received by the primary heat exchanger 11 and placed in heat exchange relationship with a RAM or ambient air 28. A resulting pre-cooled air passes into the air cycle compressor 13e. Alternatively, the pre-cooled air can bypass the compressor 13e and flow through a check valve 30, if, for example, the compressor 13e is malfunctioning and not producing high pressure air on an outflow side of the check valve 30. In that instance, air can pass through the check valve 30 and into the secondary heat exchanger 27. Air exiting the compressor 13e likewise enters the secondary heat exchanger 27. A compressed or high pressure, water vapor bearing, pre-cooled air exits the secondary heat exchanger 27 and flows to the condenser-evaporator 14.

Just as with the above embodiments above, the condenser-evaporator 14 receives the water vapor bearing air and places such air in heat exchange relationship with the vapor cycle subsystem 3. The vapor cycle subsystem 3 allows the water vapor to condense and the subsystem 3 absorbs a heat of condensation and sensible cooling produced from the heat exchange process. A water condensed air flows from the condenser-evaporator 14 and into the water extractor 16.

The water extractor 16, as in the above embodiments, extracts the condensed water to provide a dehumidified air which then flows into the reheater condenser 17. Therein, the dehumidified air absorbs the heat of condensation and sensible cooling in the vapor cycle subsystem 3, which absorption can be partial or substantially complete. A reheated air exits the reheater condenser 17 and can then flow either through the turbine bypass valve 26 as the supply or the turbine 13b. In the turbine 13b, heat of condensation and sensible cooling in the reheated air can be recovered. The turbine 13b' is mechanically engaged to the air compressor 13e and the generator 13f.

As with the embodiments above, the vapor cycle subsystem 3 in this fifth embodiment circulates a two-phase refrigerant through the condenser-evaporator 14 which places the high pressure, water vapor bearing air in heat exchange relationship with the refrigerant to evaporate the liquid phase of the refrigerant. Concurrently, the refrigerant absorbs the heat of condensation and sensible cooling produced in the condenser-evaporator 14. When the refrigerant exits the condenser-evaporator 14, the refrigerant is generally in a super heated state.

Next, the refrigerant is compressed by the vapor cycle compressor 13c that is driven by the motor 31. Upon compression, the refrigerant flows into the reheater-condenser 17 or a bypass valve 34. In the reheater-condenser 17, the refrigerant is placed in heat exchange relationship with the dehumidified air such that the heat of condensation and sensible cooling in the refrigerant is absorbed by the dehumidified air.

On the other hand, the valve 34 can be modulated to bypass some of the refrigerant around the reheater condenser 25' and into an auxiliary condenser 35 which condenses the refrigerant by using, for example, the RAM air 28 as a coolant medium. From the auxiliary condenser 35, the refrigerant converges with an exit refrigerant from the reheater-condenser 17 to produce a refrigerant 20. The refrigerant 20 is substantially in a liquid phase and can flow either through an expansion valve 33 or the expansion valve 21. In either event, the refrigerant pressure is reduced and the refrigerant transitions towards a liquid-vapor state. In that state, and through the expansion valve 33, the refrigerant can be evaporated by an evaporator 32 that can also use the RAM air 28 as a heating source. When the refrigerant exits the evaporator 32, the refrigerant is generally in a super heated state. Thereafter, the refrigerant combines with the refrigerant exiting the condenser-evaporator 14. Accordingly, the vapor cycle subsystem 12' is closed.

As can be appreciated by those skilled in the art, the present invention increases operating efficiency of an air cycle ECS by incorporating a vapor cycle subsystem 3 to condense water vapor from the air to be supplied to an enclosure. This is accomplished by the vapor cycle subsystem 3 absorbing a heat of condensation and sensible cooling in a condenser-evaporator 14 and then recovering that heat in a reheater-condenser 17 and a turbine 13b. Moreover, the vapor cycle subsystem 3 takes the cooling load off of the air cycle subsystem 2 since cold, dehumidified turbine discharge air is not needed as a heat sink for condensation. Thus, colder air may be supplied or smaller RAM air heat exchangers may be used to provide the same supply temperature. Additionally, for the same pressure level input to the air cycle subsystem 2, the present invention can deliver a colder supply, greater airflow, or could be sized to use less RAM air for the same cooling capacity. Operating efficiency is also increased since the cooling of air may still occur even when the ambient air contains little or no humidity. The present invention additionally allows for the optional integration of VSC condensing heat sinks at aircraft level, VCS cooling function at aircraft level, and optional means to power the VCS compressor by electric motor, ECS electric supply, or ECS mechanical drive.

It should be understood, of course, that the foregoing relates to preferred embodiments of the invention and that modifications may be made without departing from the spirit and scope of the invention as set forth in the following claims.

I claim:

1. A method for conditioning water vapor bearing compressed air for supply as conditioned air to an enclosure, comprising the steps of:
    a) flowing said compressed air into a condenser-evaporator heat exchanger;
    b) cooling said compressed air with a liquid evaporating refrigerant in said condenser-evaporator such that said water vapor in said compressed air can become condensed liquid water available for subsequent separation to form a dehumidified air;
    c) absorbing in said liquid evaporating refrigerant in said condenser-evaporator a heat of condensation and heat of sensible cooling rejected by condensing water vapor present in incoming air, said condenser-evaporator being located upstream of a turbine;
    d) reheating said dehumidified air with a vapor condensing refrigerant liquid in a reheater-condenser such that said dehumidified air becomes a reheated air, said reheater-condenser being located upstream of said turbine, the step of reheating having the effect of transferring back at least a part of said heat of condensation and heat of sensible heating from said refrigerant fluid to said reheated air;
    e) routing said reheated air through said turbine to provide said supply to said enclosure.

2. The method of claim 1, further comprising the step of extracting said condensed liquid water from said compressed air, said step of extracting occurring intermediate the steps of cooling said compressed air and reheating said dehumidified air.

3. The method of claim 1, further comprising the step of evaporating remaining condensed liquid water within said reheater-condenser such that said reheated air contains water substantially only in a vapor state.

4. The method of claim 1, further comprising the step of placing in heat exchange relationship said compressed air and said liquid, evaporating refrigerant within said condenser-evaporator.

5. The method of claim 1, further comprising the step of placing in heat exchange relationship said dehumidified air and said vapor refrigerant within said reheater-condenser.

6. A method for conditioning water vapor bearing compressed air for supply as conditioned air to an enclosure, comprising the steps of:
   a) flowing said compressed air into a condenser-evaporator heat exchanger, said condenser-evaporator being upstream of a turbine;
   b) cooling said compressed air by heat exchange with a two-phase refrigerant in said condenser-evaporator;
   c) extracting condensed water vapor from said compressed air such that said compressed air becomes dehumidified air;
   d) reheating said dehumidified air by heat exchange with said two-phase refrigerant in a reheater-condenser such that said dehumidified air becomes a reheated air; said reheater-condenser being located downstream of said condenser-evaporator and upstream of a turbine, with said reheater-condenser thereby being capable of reheating a turbine inlet air by rejection of at least a part of a heat of condensation absorbed by said refrigerant in said condenser-evaporator, the step of reheating occurring after the step of extracting; and
   e) routing said reheated air through said turbine to provide said supply to said enclosure.

7. The method of claim 6, further comprising the step of evaporating condensed water vapor within said reheater-condenser.

8. The method of claim 6, further comprising the step of placing an air cycle subsystem in heat exchange relationship with a vapor cycle subsystem that comprises said two-phase refrigerant.

9. The method of claim 8, wherein said vapor cycle subsystem is in heat exchange relationship within said reheater-condenser and with said air cycle subsystem such that a heat of condensation absorbed by said vapor-cycle subsystem in said condenser-evaporator may be at least partially recovered by said air-cycle subsystem in said reheater-condenser.

10. The method of claim 6, further comprising the step of compressing said two-phase refrigerant after the step of cooling said compressed air.

11. The method of claim 6, further comprising the step of compressing said two-phase refrigerant prior to the step of reheating said dehumidified air.

12. An air cycle environmental control system for conditioning water vapor bearing compressed air for supply to an enclosure as conditioned air, comprising:
   a condenser-evaporator heat exchanger capable of placing said compressed air in heat exchange relationship with a vapor cycle subsystem, said condenser-evaporator capable of producing condensed water, said vapor cycle subsystem comprising a two-phase refrigerant, a VCS compressor, said condenser-evaporator, and a second heat exchanger reheater-condenser capable of receiving said refrigerant from said VCS compressor and returning said refrigerant to a VCS expansion valve and said condenser-evaporator;
   a water extractor in flow communication with said condenser-evaporator, said extractor for extracting said condensed water to produce a dehumidified air;
   a reheater-condenser in flow communication with said water extractor, said reheater-condenser capable of placing said dehumidified air in heat exchange relationship with said vapor cycle subsystem to produce an evaporated air; and
   a turbine in flow communication with said reheater-condenser, said turbine capable of producing cooled, expanded air to said enclosure.

13. The environmental control system of claim 12, wherein said water extractor is intermediate said condenser-evaporator heat exchanger and said reheater-condenser.

14. The environmental control system of claim 12, wherein said turbine is downstream of said reheater-condenser.

15. The environmental control system of claim 12, wherein said two-phase refrigerant flows from said condenser-evaporator to said reheater-condenser.

16. The environmental control system of claim 15, wherein said VCS compressor is intermediate said condenser evaporator and said reheater-condenser.

17. The environmental control system of claim 12, wherein after refrigerant is splitable in selectable amounts between said reheater-condenser and said second condenser.

18. The environmental control system of claim 17, wherein at least one of said first and second condensers places said refrigerant in heat exchange relationship with a separate cooling medium to cool the refrigerant, resulting in a condensed liquid refrigerant.

19. The environmental control system of claim 18, wherein said cooling medium is ambient air drawn from a separate RAM air circuit in an air cycle subsystem.

20. The environmental control system of claim 18, wherein said cooling medium is RAM air from a same cooling circuit in an air cycle subsystem.

21. The environmental control system of claims 19 or 20, wherein said VCS compressor is mechanically driven by said turbine.

22. The environmental control system of claims 19 or 20, wherein said VCS compressor is driven by a separate electrical motor.

23. The environmental control system of claims 19 or 20, wherein said turbine and a fan are mechanically located on a common shaft.

24. The environmental control system of claims 8, 19 or 20, wherein said turbine, a compressor and a fan are mechanically located on a common shaft.

25. The environmental control system of claims 8, 19 or 20, wherein said turbine and compressor are mechanically located on a common shaft and a fan is driven by a separate electric motor.

26. The environmental control system of claims 19 or 20, wherein said turbine drives an electrical generator located on a common shaft.

27. The environmental control system of claims 8, 19 or 20, wherein said turbine drives an electrical generator and said compressor located on a common shaft.

28. The environmental control system of claim 27, wherein said electrical generator is capable of providing power to a separate electric motor that drives said VCS compressor.

29. The environmental control system of claim 27, wherein said electrical generator is capable of providing power to a separate electric motor that drives said fan.

30. The environmental control system of claim 26, wherein said electrical generator is capable of providing power to a separate electric motor that drives said VCS compressor.

31. The environmental control system of claim 26, wherein said electrical generator is capable of providing power to a separate electric motor that drives said fan.

32. The environmental control system of claim 20, wherein said vapor cycle subsystem further comprises a second VCS evaporator capable of receiving a selectable portion of refrigerant fluid from said reheater-condenser.

33. The environmental control system of claim 32, wherein a cooling medium for said second VCS evaporator is an air cycle RAM intermediate a secondary heat exchanger and a primary heat exchanger.

34. The environmental control system of claim 33, wherein said second VCS condenser utilizes as a cooling medium air cycle RAM air downstream of said primary heat exchanger.

35. The environmental control system of claim 18, wherein said second VCS condenser utilizes as a cooling medium cabin return air prior to being routed overboard.

36. The environmental control system of claim 18, wherein said second VCS condenser utilizes as a cooling medium aircraft fuel.

37. The environmental control system of claim 18, wherein said second VCS condenser utilizes as a cooling medium a transport fluid in heat exchange relationship in a closed loop transport circuit with a primary cooling medium.

38. The environmental control system of claim 37, wherein said primary cooling medium is cabin exhaust air.

39. The environmental control system of claim 37, wherein said primary cooling medium is aircraft fuel.

40. A vapor-to-air cycle system for conditioning water vapor bearing air, comprising:
    an air cycle subsystem comprising a condenser-evaporator, a reheater-condenser downstream of said condenser-evaporator, and a turbine downstream of said reheater-condenser; and
    a vapor cycle subsystem in heat exchange relationship with said condenser-evaporator and said reheater-condenser, whereby a heat of condensation from said air can be absorbed by a vapor cycle refrigerant fluid in said condenser-evaporator, transferred by said refrigerant fluid to said air cycle subsystem in said reheater-condenser, and recovered by a turbine for conversion of said heat to useful energy in said air-cycle subsystem.

41. The system of claim 40, wherein said air cycle subsystem further comprises a water extractor intermediate said condenser evaporator and said reheater condenser.

42. The system of claim 40, wherein said vapor cycle subsystem further comprises a refrigerant that is capable of flowing from said condenser evaporator and to said reheater condenser.

43. The system of claim 42, wherein said vapor cycle subsytem further comprises a compressor intermediate said condenser evaporator and said reheater condenser.

44. The system of claim 42, wherein said vapor cycle subsystem further comprises a vapor heat exchanger condenser upstream of said condenser evaporator.

45. A vapor-to-air cycle system for conditioning water vapor bearing air, comprising:
    a vapor cycle subsystem comprising a two-phase refrigerant, a condenser-evaporator, a compressor downstream of said condenser-evaporator and a reheater-condenser downstream of said compressor; and
    an air cycle subsystem comprising said condenser-evaporator, said reheater-condenser downstream of said condenser-evaporator, a water extractor downstream of said condenser-evaporator and upstream of said reheater-condenser, and a turbine downstream of said reheater-condenser, said condenser-evaporator being capable of placing said water vapor bearing air in heat exchange relationship with said vapor cycle subsystem, said water extractor being capable of producing dehumidified air by extracting at least a part of condensed water in said water vapor bearing air, said reheater-condenser being capable of placing in heat exchange relationship said dehumidified air and said vapor cycle subsystem, whereby a heat of condensation from said water vapor bearing air and that is absorbed by said refrigerant in said condenser-evaporator can be transferred by said reheater-condenser to said dehumidified air so a reheated air is produced that flows to an inlet of said turbine where said heat of condensation can be at least partially recovered.

46. The system of claim 45, wherein said vapor cycle subsystem further comprises a compressor intermediate said condenser evaporator and said reheater condenser.

47. The system of claim 46, wherein said vapor cycle subsystem further comprises a vapor heat exchanger condenser downstream of said compressor and upstream of said condenser evaporator.

48. The system of claim 47, wherein said vapor cycle subsystem further comprises an expansion valve upstream of said condenser evaporator.

49. The system of claim 45, wherein said air cycle subsystem further comprises a heat exchanger and an air compressor, said heat exchanger and air compressor being upstream of said condenser evaporator.

50. The system of claim 45, wherein said turbine is downstream of said reheater condenser.

51. An air cycle environmental control system for conditioning water vapor bearing compressed air for supply to an enclosure as conditioned air, comprising:
    a condenser-evaporator heat exchanger capable of placing said compressed air in heat exchange relationship with a vapor cycle subsystem, and said condenser-evaporator capable of producing condensed water;
    a water extractor in flow communication with and downstream of said condenser-evaporator, said extractor for extracting said condensed water to produce a dehumidified air;
    a reheater-condenser in flow communication with and downstream of said water extractor, said reheater-condenser capable of placing said dehumidified air in heat exchange relationship with said vapor cycle subsystem to absorb a heat of condensation, a heat of sensible cooling, and a heat of compression from said vapor cycle subsystem and to produce an evaporated air; and
    a turbine in flow communication with and downstream of said reheater-condenser, said turbine capable of producing cooled, expanded air to said enclosure.

* * * * *